United States Patent [19]

Charlot

[11] 3,947,542

[45] Mar. 30, 1976

[54] PROCESS FOR TREATMENT OF PYROCHLORE CONCENTRATES

[75] Inventor: Gaston Charlot, Paris, France

[73] Assignee: Societe Francaise D'Electrometallurgie, Paris, France

[22] Filed: Dec. 7, 1973

[21] Appl. No.: 422,668

[30] Foreign Application Priority Data

Dec. 8, 1972   France .............................. 72.43692

[52] U.S. Cl. ...................... 423/18; 423/21; 423/22; 423/65; 423/68; 423/82; 423/166; 423/252; 252/301.1 R
[51] Int. Cl.² ......................................... B01D 11/00
[58] Field of Search ............ 423/18, 65, 68, 82, 21, 423/22, 166, 252; 252/301.1 R

[56] References Cited
UNITED STATES PATENTS 2,885,259   5/1959   McCullough ..................... 423/18 X
2,932,555   4/1960   Flynn ............................... 423/18 X Primary Examiner—Stephen J. Lechert, Jr.
Attorney, Agent, or Firm—McDougall, Hersh & Scott

[57]  ABSTRACT

A continuous process for extraction of niobium, rare earths and thorium from niobium ore concentrates which includes digesting the ore with a hot solution containing 13 to 16 moles of sulphuric acid per liter, diluting the solution to a concentration of 10 to 13 moles of sulphuric acid per liter, separating the insolubles from the solution which includes alkaline earth sulphates and the sulphates of thorium and rare earths that are present, reducing titanium in solution to the trivalent state and diluting the solution to a concentration of 5 to 7 moles of sulphuric acid per liter, separating the precipitated niobium oxide and sulphates of thorium and rare earths, and then concentrating the resulting solution to the level desired for recycle to the digestion stage.

10 Claims, No Drawings

PROCESS FOR TREATMENT OF PYROCHLORE CONCENTRATES

The invention relates to a process of treatment of pyrochlore concentrates.

Pyrochlores, which are alkaline earth niobutes and generally niobates of calcium or barium, occur in relative abundance in various countries. An advantage is that they contain only small proportions of tantalum so that it is frequently unnecessary to separate the latter metal from the niobium.

Concentrates of naturally-occurring pyrochlores constitute one of the starting materials normally employed to obtain niobium, the most usual method being digestion with hydrofluoric acid followed by extraction of niobium with methyl isobutyl ketone. This process is, however, expensive, owing chiefly to the cost of the reagents employed.

Another suggested method is to digest various niobium ores or concentrates with sulphuric acid, a substance which is relatively inexpensive.

A disadvantage, however, is that pyrochlores contain significant quantities of titanium which is present in the tetravalent state and precipitates together with niobium pentoxide from sulphuric acid solution, thus contaminating the niobium obtained as an end product. They also generally contain radioactive elements, such as thorium, which have to be removed from the solid or liquid residues obtained. Frequently, they also contain small quantities of rare earths, the separation of which may be desirable for economic reasons.

In Norwegian Pat. No. 83,984, for instance, description is made of a method of treating ore from Sove, Norway, which consists of a mixture of coppite and columbite, this latter containing more tantalum and titanium. The patent proposes a two-stage digestion with sulphuric acid wherein only the coppite is dissolved in the first stage. However, the acid concentrations referred to are poorly calculated and would in fact appear to be only about half that which has been found necessary for digestion of the pyrochlores.

U.S. Pat. No. 2,259,396 describes a process for sulphuric acid digestion of a niobium ore containing aluminum, manganese, barium, calcium and iron, the latter in substantial quantities. While the process described in the patent is said to constitute a simple method of separating numerous impurities and titanic, niobic, vanadic and tantalic acids, wherein the acid solution obtained is merely diluted, the patent does not teach a reliable method of separating titanium from niobium and tantalum and yields a residual solution which is contaminated with iron, vanadium, manganese, aluminum and magnesium sulphates and therefore seemingly unfit for further use.

French Pat. No. 882,043 describes the separation of tantalum and niobium present in an ore which also contains iron, tin, manganese and titanium, wherein the ore is digested with sulphuric acid and the solution reacted with zinc to reduce the iron, manganese, titanium and tin, which remains in solution on precipitation of the tantalum and niobium, which are subsequently separated from each other.

In addition to the fact that the experimental results obtained in investigations of the treatment of pyrochlores are not always as claimed, none of the patents referred to above provides a process suitable for the treatment of pyrochlores. None of the processes referred to above has been used on an extensive industrial scale or, more specifically, as far as applicant is aware, for the treatment of pyrochlores.

It is an object of this invention to obtain, at low cost, a precipitate composed of niobium and tantalum oxides which is not contaminated by titanium or other metals occurring in pyrochlores.

A further object of the invention is the separate recovery of the rare earths and radioactive products, such as thorium contained in certain pyrochlores.

A still further object of the invention is to eliminate the titanium present in pyrochlores.

A still further object of the invention is to obtain a final filtrate containing titanium in such small amounts that it may be recycled for the purpose of digestion.

In accordance with the process of this invention, the ore is digested with a solution of sulphuric acid obtained by concentrating and recycling the solution from which niobium oxide has been removed. This solution, used for digestion, has a concentration of sulphuric acid of 13 to 16 moles per liter and preferably close to 15 moles per liter.

No higher concentration can be obtained simply by concentrating a dilute solution, unless of course a high rate of loss of sulphuric acid is accepted. More importantly, higher concentrations are less efficient in terms of the rate of digestion of niobium, which drops from 96% by weight for a concentration of 15 moles/liter to 92% by weight for a concentration of 18 moles/liter under the same conditions. Lower concentrations are also associated with a slower rate of digestion and lesser solution of niobium. The digestion mixture is then diluted with water or dilute sulphuric acid to ca. 12 moles/liter and filtered to separate the undigested residue and precipitated sulphates, particulately sulphates or iron and alkaline earth metals. The insolubles may contain a proportion of rare earths, depending mainly on the ore employed. It has been found, although no satisfactory explanation can as yet be offered, that in the case of a pyrochlore consisting essentially of barium niobate, the bulk of the rare earths remains in the undigested residue, whereas in the case of a pyrochlore consisting mainly of calcium niobate and also containing fluorine, only a relatively small fraction of the rare earths present are precipitated at this stage of the process.

Following the reduction of the titanium contained in the initial filtrate (as described below) and further filtration, this second filtrate is diluted to a concentration of 4 to 7 moles/liter of acid, thus bringing about the precipitation of niobium oxide, the remainder of the rare earths and thorium. From this dilution stage and as far as the stage of precipitation of titanium, the solutions are protected by a non-oxidizing atmosphere.

After separation, the precipitate is preferably treated with 1.5 to 3 moles/liter hydrochloric acid solution to separate niobium oxide, which remains as a solid, from the thorium and rare earths which are taken into solution and can subsequently be precipitated, as with oxalic acid.

The liquor, from which niobium and rare earths have been precipitated, is reconcentrated by evaporation at atmospheric pressure to a concentration which, allowing for the addition, if necessary, of fresh concentrated acid to offset any losses, is suitable for use as the digestive agent, i.e. 15 to 15 moles/liter. Reconcentration is preferably carried out in two stages as hereinafter discussed.

As previously pointed out, the tetravalent titanium, contained in the solution obtained by digestion, would precipitate with the niobium and be difficult to separate therefrom unless certain precautions were taken. These precautions include the introduction of a reducing agent into the solution, the preferred reducing agent being aluminum.

The reducing agent can be added either during digestion, to the resultant slurry, to the solution diluted to 0.5 to 13 moles/liter of sulphuric acid with a view toward separation of alkaline earth sulphates, or to the solution containing 4 to 7 moles/liter of sulphuric acid from which the niobium is precipitated.

It has been found, on the one hand, that reduction at the time of digestion, or in the resultant slurry, involves a tedious and difficult process of filtration to recover the excess reducing agent, and on the other hand, that reduction at the niobium oxide precipitation stage does not enable niobium, containing less than 1% of titanium, to be obtained, owing perhaps to entrainment. Hence, it is preferred to add the reducing agent to the solution containing 10.5 to 13 moles/liter of sulphuric acid. The reaction is a slow one (one to three hours) and is stopped at a suitable stage to obviate the reduction of niobium and consequent needless consumption of reducing agent.

The commencement of niobium reduction is indicated by the appearance of a blue coloration.

The reducing agent is introduced in the form of granules or flakes of size less than 6 mm and the solution is stirred during the reduction process. The solution is preferably shielded from air oxidation, as by blanketing with a protective atmosphere, such as flue gas.

Prior to the reduction process, the sludge, composed of insoluble ore residues and precipitated sulphates, is preferably removed. A second filtration stage, after reduction, then enables unused reducing agent to be recovered.

At least a part of the titanium now present in the trivalent form has to be eliminated, otherwise the titanium content builds up to undesirable levels in the solutions concerned as a result of recycling.

Determinations have been made of the solubility of trivalent titanium in aqueous sulphuric acid solution under industrial conditions, i.e., in cold solutions in which the equilibrium condition has not been established, since the latter takes a considerable time. Determinations were carried out in cold solutions after periods not exceeding a few hours with the following results:

| moles sulphur acid per liter | grams trivalent titanium dissolved per liter |
|---|---|
| 15 | 9.0 |
| 12 | 0.7 |
| 10 | 0.3 |
| 9 | 0.2 |
| 8 | 0.3 |
| 7 | 0.4 |
| 6 | 1.2 |

Based on the solubility curve, the titanium can be separated by arresting the process of concentration of the niobium-free solution at between 7 and 10 moles/liter of sulphuric acid and cooling slightly to precipitate trivalent titanium. Titanium is separated and the solution, which now contains little titanium, is further concentrated. The process of concentration can be taken either to the point at which the solution can be re-used for digestion of a fresh batch of ore or to a point at which fresh acid can be added to offset losses and give the desired concentration.

Needless to say, any possibility of oxidation between the titanium reduction and precipitation stages has to be avoided, e.g. by blanketing solutions with an inert atmosphere, such as flue gas.

For the sake of simplicity, the separation of slurry components has been described as being carried out by filtration, but other methods of separation, such as decantation, centrifuging, etc. can of course be employed in carrying out the process of this invention.

EXAMPLE 1

1,000 kg of pyrochlore having the following composition (% w/w) was treated:

| | | | |
|---|---|---|---|
| $Nb_2O_5$ | 53 | MgO | 1 |
| CaO | 16 | SrO | 1 |
| $TiO_2$ | 5 | $SO_3$ | 0.8 |
| FeO | 4 | $K_2O$ | 0.5 |
| $CeO_2$ | 4 | $Al_2O_3$ | 0.5 |
| $Na_2O$ | 3.5 | $Ta_2O_5$ | 0.5 |
| $SiO_2$ | 3 | $P_2O_5$ | 0.4 |
| F | 3 | $MnO_2$ | 0.3 |
| Rare earth oxides | 1 | $ThO_2$ | 0.2 |

The ore was digested for one hour at 165°C with 10,000 liters (17,600 kg) of a solution containing 15 moles/liter of sulphuric acid. The whole was then cooled to 40°C and 4,560 liters (6,000 kg) of a recycled 5.5 moles/liter sulphuric acid solution added with cooling. Insolubles and the sulphate precipitates formed were filtered off and the solid residue, thus separated from the first stage filtrate, was washed first with a 12 moles/liter sulphuric acid solution, the washings being subsequently (see below) combined with the filtrate, and then with water.

This first-stage filtrate was treated with 1-3 mm aluminum powder and stirred for three hours under a protective atmosphere of flue gas. Excess aluminum powder was recovered by filtration and washed with 12 moles/liter sulphuric acid, the washings being combined with the filtrate. The filtrate was then added over a period of ninety minutes to 12,850 kg of boiling water, with stirring and under an atmosphere of flue gas, and then cooled. A precipitate containing niobium was formed, filtered off and washed with water. The washings, together with those obtained on the first-stage dilution (above), were combined with the filtrate.

The solution obtained, amounting to 33,100 liters, was evaporated by boiling until the sulphuric acid concentration increased to 9 moles/liter and then cooled. Contact with air was avoided at all times. A precipitate, containing 45 kg of titanium (expressed as titanium dioxide) formed and was filtered off. Evaporation was continued to achieve a concentration of 15 moles/liter of sulphuric acid and the solution then recycled to the digestion stage.

The precipitate, obtained on second-stage dilution, contained 508 kg of niobium oxide, the bulk of the rare earth oxides and the thorium oxide derived from the ore.

This precipitate was digested for 30 minutes with 2,400 kg of hot 2 moles/liter hydrochloric acid. This yielded a solid, consisting essentially of niobium oxide plus impurities, as listed below:

| | | | |
|---|---|---|---|
| S  | 600 ppm   | Al | 230 ppm |
| Si | 25 ppm    | Cr | 10 ppm  |
| Sn | 20 ppm    | Fe | 10 ppm  |
| Ta | 3,450 ppm | Mn | 10 ppm  |
| Ti | 470 ppm   | Ni | 20 ppm  |

The solution obtained was neutralized with ammonia and 64 kg oxalic acid was added, yielding 76 kg precipitate (after ignition) and containing the rare earth oxides (including 180 grams of europium oxide) and thorium oxide derived from the ore.

EXAMPLE 2

An ore concentrate having the following composition (% w/w) was treated:

| | | | |
|---|---|---|---|
| $Nb_2O_5$ | 53 | $Al_2O_3$ | 0.4 |
| Ba | 14 | $P_2O_5$ | 0.4 |
| $SiO_2$ | 14 | $SO_3$ | 0.3 |
| $TiO_2$ | 3.9 | $Ta_2O_5$ | 0.2 |
| FeO | 2 | MnO | 0.05 |
| Rare earth oxides | 2 | $SnO_2$ | 0.05 |
| $ThO_2$ | 2 | | |

The treatment was the same as for Example 1 with one exception: rare earths and thorium were precipitated (with oxalic acid) not only from the solution obtained by washing the niobium oxide — which contained very little of these elements — but from this solution combined with the water washings of the residue after digestion. These combined solutions were neutralized and treated with oxalic acid.

Analysis of the niobium oxide obtained gave the following results:

| | | | |
|---|---|---|---|
| S  | 2,500 ppm | Al | 10 ppm |
| Si | 300 ppm   | Cr | 10 ppm |
| Sn | 160 ppm   | Fe | 10 ppm |
| Ta | 1,270 ppm | Mn | 10 ppm |
| Ti | 450 ppm   | Ni | 20 ppm |

The precipitate, which weighed ca. 40 kg after ignition, contained ca. 54% of rare earth oxides (including 70 grams of europium) and 45% of thorium oxide.

I claim:

1. A continuous process for treatment of niobium ore concentrates containing titanium, rare earth, thorium, iron and alkaline earth in addition to niobium to extract niobium, rare earths and thorium, comprising the steps of:
   1. digesting the ore with a hot solution containing 13 to 16 moles of sulphuric acid per liter;
   2. diluting the solution with aqueous medium to a concentration of 10.5 to 13 moles of sulphuric acid per liter to precipitate iron, alkaline earth and some of the rare earths as their sulphates;
   3. separating the undigested residue and the precipitated sulphates from the solution;
   4. reducing titanium in the solution from the tetravalent state to the trivalent state;
   5. diluting the solution with aqueous medium to a concentration of 4 to 7 moles of sulphuric acid per liter to precipitate niobium oxide, and thorium and the remainder of the rare earths as their sulphates, leaving the tetravalent titanium in solution; and
   6. separating the precipitate consisting essentially of niobium oxide and sulphates of thorium and rare earths.

2. The process as claimed in claim 1 in which the reduction of titanium to the trivalent state is achieved by the addition of aluminum in powder or granular form.

3. The process as claimed in claim 1 in which the niobium oxide and sulphates of thorium and rare earths are separated by filtration.

4. The process as claimed in claim 1 which includes the step of concentrating the final solution to increase the concentration of sulphuric acid for recycle to the digesting step.

5. The process as claimed in claim 1 which includes the step of maintaining a protective atmosphere to obviate re-oxidation of titanium at least from the stage in which the solution is diluted to a concentration of 5 to 7 moles per liter and in the titanium precipitation stage.

6. The process as claimed in claim 5 in which the protective atmosphere is flue gas.

7. The process as claimed in claim 1 in which the precipitate obtained by digestion and/or upon dilution to 5 to 7 moles of sulphuric acid per liter is washed with water.

8. The process as claimed in claim 1 in which the precipitate obtained by digestion and dilution to 5 to 7 moles of sulphuric acid per liter is washed with a solution containing 2 to 3 moles of hydrochloric acid per liter to redissolve rare earths and thorium.

9. The process as claimed in claim 8 in which the rare earths and thorium are precipitated from the acid solution by the addition of oxalic acid.

10. The process as claimed in claim 1 which includes the step of concentrating the filtrate from the separation of the niobium-containing precipitate to 8 to 10 moles of sulphuric acid per liter, filtering off the precipitate that is formed which contains the bulk of the titanium originally present in the ore, and then further concentrating the solution to a sulphuric acid concentration required for the purpose of the digesting step.

* * * * *